May 1, 1934.  O. MORGENSEN, JR  1,957,075
AIRPLANE SPRAY EQUIPMENT
Original Filed Sept. 29, 1931
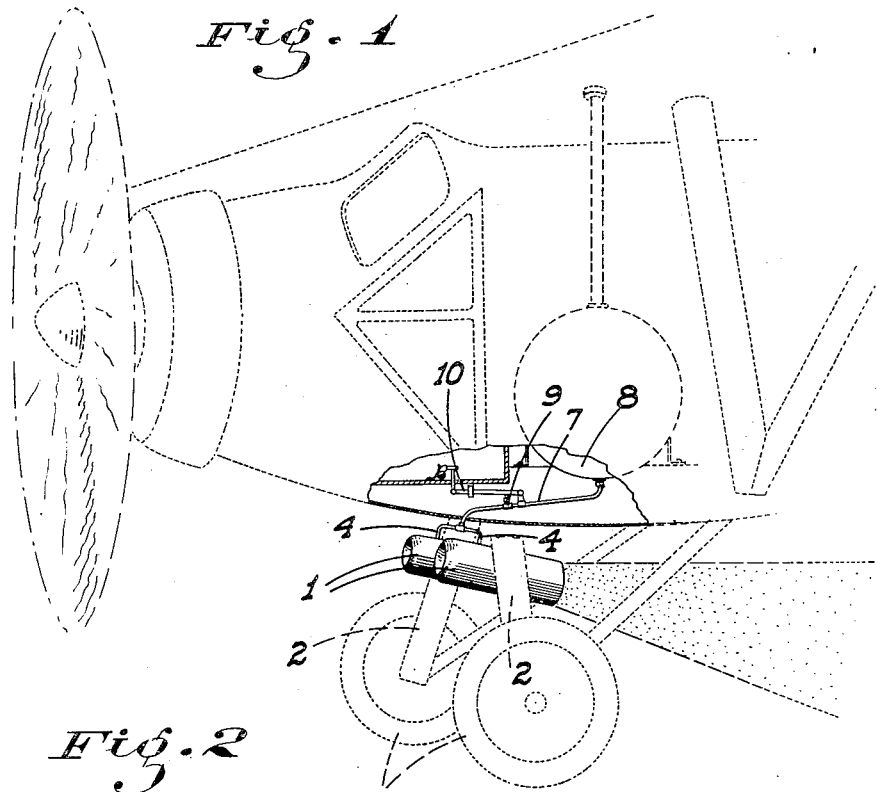
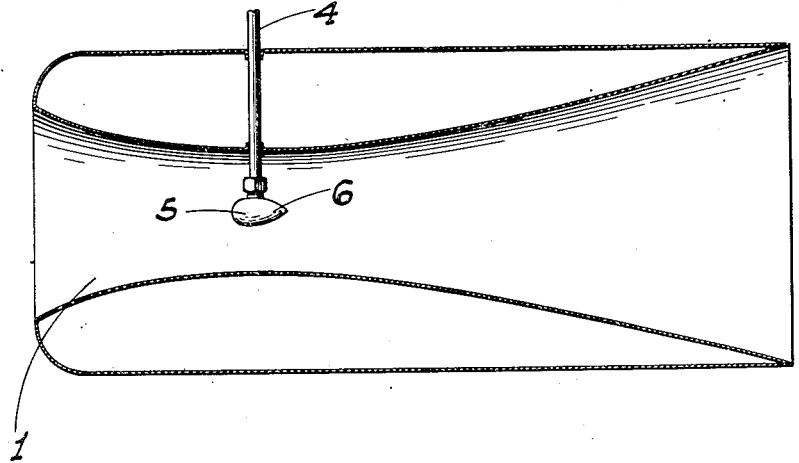
INVENTOR
O. Morgensen Jr.
BY
ATTORNEY Patented May 1, 1934

1,957,075

UNITED STATES PATENT OFFICE 1,957,075

AIRPLANE SPRAY EQUIPMENT

Otto Morgensen, Jr., Modesto, Calif., assignor to E. R. Hawke, Modesto, Calif.

Application September 29, 1931, Serial No. 565,780
Renewed September 25, 1933

3 Claims. (Cl. 244—1)

This invention relates to the distribution of liquid sprays from an airplane in flight especially for pest and insect control. My principal object is to provide an apparatus for the purpose adapted to be mounted on an airplane and so constructed that the rush of air induced by the movement of the airplane and the blast from the propeller will automatically create and distribute a thoroughly atomized spray over the adjacent territory without the use of moving parts or relatively complicated bulky mechanism of any character.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary perspective outline of an airplane showing my improved spray equipment mounted thereon.

Fig. 2 is an enlarged longitudinal section of a spray atomizing unit of the equipment.

Referring now more particularly to the characters of reference on the drawing, the equipment comprises a pair of relatively long Venturi members 1. These are adapted to be mounted on the airplane on opposite sides and below the fuselage so as to extend lengthwise of the airplane and so that they are directly exposed to the rush of air induced by the airplane in flight. A convenient location for these members is in connection with the supporting struts 2 of the landing wheels 3, to which struts the members may be readily strapped or otherwise secured in any suitable manner.

Each tube has a liquid supply pipe 4 projecting radially into the same in the zone of the throat and provided on its end with a jet member 5 disposed axially of the throat and having rearwardly facing jet openings 6. The spray liquid to be atomized is supplied to the pipe and jets of both tubes from the main pipe 7 connected to both pipes 4 and leading from a supply tank 8 mounted in the fuselage of the airplane in a convenient position. The flow through the pipe 7 is governed by a valve 9 whose operation is controlled by the pilot from his seat by a suitable pedal actuating mechanism as shown at 10, or other equivalent device.

In operation the rush of air due to the flight of the airplane entering the Venturi tube, becomes restricted and somewhat compressed on reaching the throats of the tubes, increasing its velocity at this point; and expanding after leaving the throats. The liquid issuing from the jets therefore is picked up by the high velocity and expanding air which thoroughly atomizes the liquid and causes the intimate mixing of the same with the air. The tubes extend a considerable distance beyond their throats so that the spray mixtures are controlled and their discharge into the atmosphere directed in a more definite manner than would otherwise be the case. Such discharge therefore takes the form of a well defined stream.

From the foregoing description it will be readily seen that I have produced such a device as substantially fulfills the objects of the invention as set forth herein.

While this specification sets forth in details the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with an airplane an open ender Venturi tube mounted on the airplane with its axis extending lengthwise of the airplane and in a position to be exposed to the rush of air inducted by the flight of the airplane, a rearwardly facing stream line jet element mounted centrally and axially in the throat of the Venturi tube, and means to supply a liquid to said jet element.

2. In combination with an airplane an open ended Venturi tube mounted on the airplane with its axis inclined angularly to the fuselage of the airplane, and in position to be exposed to the rush of air induced by the flight of the airplane, a rearwardly facing stream line jet element mounted centrally and axially in the throat of the Venturi tube, and means to supply a liquid to said jet element.

3. In combination with an airplane an open ended Venturi tube, mounted on the airplane in relatively close relation to the propeller and in a position to be exposed to the blast of the propeller and the rush of the air induced by the flight of the airplane, a rearwardly facing stream line jet element mounted centrally and axially in the throat of the Venturi tube, and means to supply a liquid to said jet element, whereby when the airplane is in motion an air stream of great velocity passes through the throat of the Venturi tube and thoroughly atomizes and distributes all liquid that is discharged from the jet element.

OTTO MORGENSEN, JR.